United States Patent
Tsuchiya et al.

(10) Patent No.: US 8,447,334 B2
(45) Date of Patent: May 21, 2013

(54) NETWORK CONTROL DEVICE AND NETWORK CONTROL METHOD

(75) Inventors: Osamu Tsuchiya, Kawasaki (JP); Shuichi Abe, Kawasaki (JP); Yoshiyuki Imai, Kawasaki (JP); Takayuki Moriyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 394 days.

(21) Appl. No.: 12/776,029

(22) Filed: May 7, 2010

(65) Prior Publication Data

US 2010/0291932 A1 Nov. 18, 2010

(30) Foreign Application Priority Data

May 13, 2009 (JP) ................ 2009-116767

(51) Int. Cl.
*H04W 68/00* (2009.01)
*H04W 36/00* (2009.01)
*H04W 4/00* (2009.01)
*H04M 3/42* (2006.01)

(52) U.S. Cl.
USPC ........... 455/460; 455/436; 455/438; 455/439; 455/442; 379/209.01; 379/207.05; 379/207.04; 370/331

(58) Field of Classification Search
USPC ..... 455/460, 436, 438, 439, 442; 379/209.01, 379/207.05, 207.04; 370/331
See application file for complete search history.

(56) References Cited

U.S. PATENT DOCUMENTS

| | | | |
|---|---|---|---|
| 6,175,731 B1 * | 1/2001 | Ohsuge | 455/426.1 |
| 8,238,249 B2 * | 8/2012 | Kazmi et al. | 370/237 |
| 2005/0048973 A1 * | 3/2005 | Hou et al. | 455/436 |

FOREIGN PATENT DOCUMENTS

| | | |
|---|---|---|
| JP | 64-007846 A | 1/1989 |
| JP | 02-094829 | 4/1990 |
| JP | 03-188720 A | 8/1991 |
| JP | 2006-191616 | 7/2006 |
| JP | 2008-306432 | 12/2008 |

OTHER PUBLICATIONS

Japanese Office Action mailed Feb. 12, 2013 for corresponding Japanese Application No. 2009-116767, with English-language translation.

* cited by examiner

*Primary Examiner* — Kamran Afshar
*Assistant Examiner* — Omoniyi Obayanju
(74) *Attorney, Agent, or Firm* — Fujitsu Patent Center

(57) ABSTRACT

As a network control device which controls a call connection between a calling party terminal and a called party terminal, a network control device determines whether the own network control device is in a congestion state when a handover request is acquired from another network control device which is in the congestion state, and stops transmitting a busy tone to a mobile terminal which is the calling party terminal and transmits a ring back tone to the mobile terminal when it is determined that the own network control device is not in the congestion state.

4 Claims, 11 Drawing Sheets

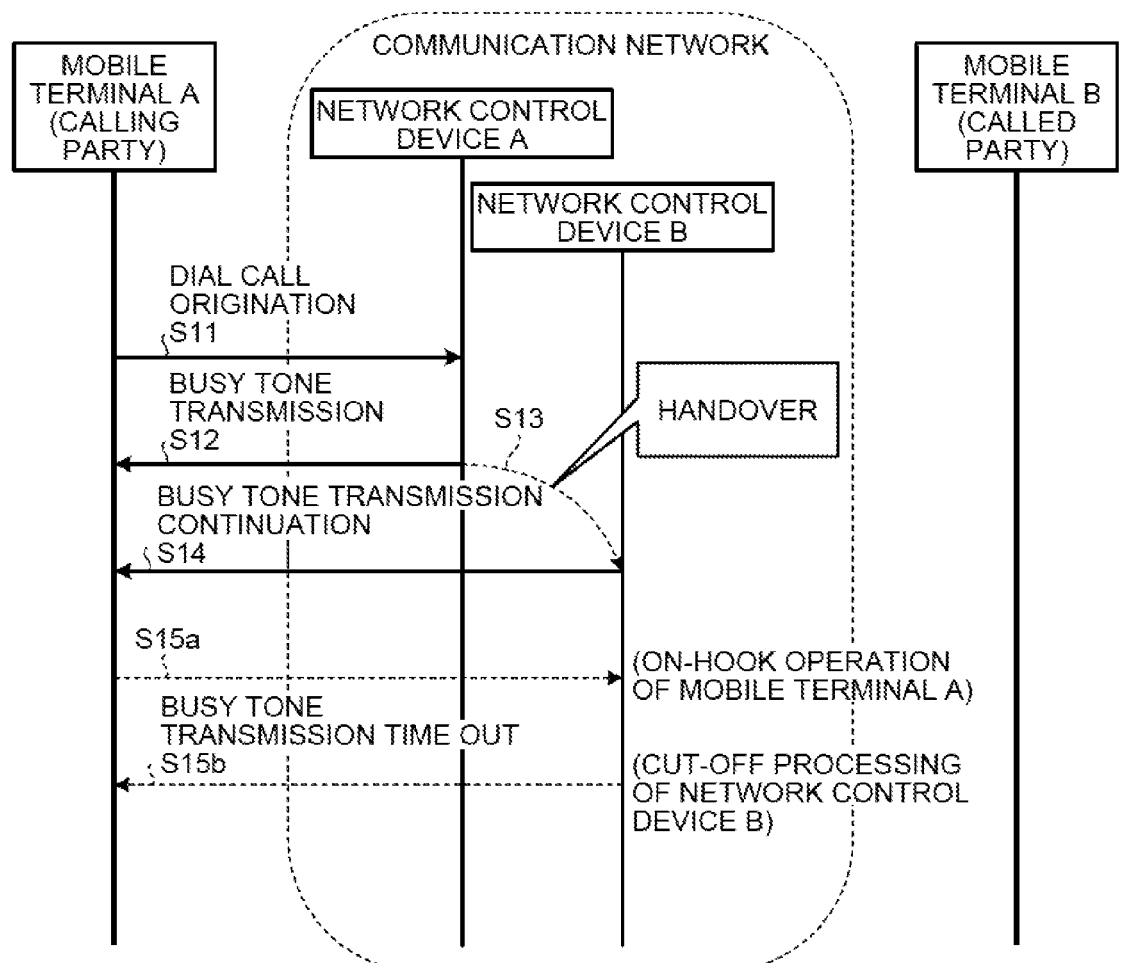

NETWORK CONTROL DEVICE AND NETWORK CONTROL METHOD

CROSS-REFERENCE TO RELATED APPLICATION(S)

This application is based upon and claims the benefit of priority of the prior Japanese Patent Application No. 2009-116767, filed on May 13, 2009, the entire contents of which are incorporated herein by reference.

FIELD

The embodiment discussed herein is directed to a network control device and a network control method.

BACKGROUND

In recent years, as the number of mobile terminal users increases, the number of terminals which are present in the same base station area or the same region is increasing. For this reason, for example, a speech communication disable state may occur around the places in which events that attract large crowds such as fireworks events and coming-of-age events are held. If many users which are present in the same area try communication at the same time, congestion of a communication network occurs, so that it is difficult to connect to a communication network. It is desirable that a mobile terminal can perform communication any time anyplace, but it cannot be realized due to the congestion described above.

FIG. 11 is a sequence diagram illustrating the flow of processing until a mobile terminal A as a mobile terminal of a calling party connects with a mobile terminal B as a mobile terminal of a called party. As illustrated in FIG. 11, when a dial call origination for connecting with the mobile terminal B is acquired from the mobile terminal A (step S01), a network control device A pages the mobile terminal B (step S02) and transmits a ring back tone to the mobile terminal A (step S03). For example, the network control device A is a radio network controller (RNC) which centrally controls a plurality of base stations. When the mobile terminal B does not perform speech communication but is in a connectable state, the network control device A receives a response which represents that speech communication is possible from the mobile terminal B (step S04) and connects the mobile terminal A with the mobile terminal B (step S05). Therefore, the mobile terminal A and the mobile terminal B enter a speech communication enable state.

In the above-described processing, when the network control device A is in a congestion state, the network control device A transmits a busy tone which states "The line is busy. Please call again later" to the mobile terminal A. Therefore, a user of the mobile terminal A can recognize that speech communication with the mobile terminal B is impossible.

A conventional network control as described above is disclosed in for example Japanese Laid-open Patent Publication No. 3-188720.

However, even when the mobile terminal moved to a base station area of a different network control device which is not in a congestion state during transmission of the busy tone, the user of the mobile terminal has to terminate the connection with the network control device and then perform a dial call origination again, and thus it is inconvenient.

FIG. 12 is a sequence diagram illustrating the flow of processing when a mobile terminal of a calling party which is receiving the busy tone is handed over to a different network control device. As illustrated in FIG. 12, when a mobile terminal A performs a dial call origination (step S11), a network control device A which is in the congestion state transmits the busy tone to the mobile terminal A (step S12). Therefore, a user of the mobile terminal A can recognize that the communication network is in the congestion state.

For example, if the mobile terminal A moves from a base station area managed by the network control device A which is in the congestion state to a base station area managed by a network control device B, handover processing is performed between the network control device A and the network control device B (step S13). The handover represents that a network control device which connects with a mobile terminal is changed.

At this time, the network control device B which is connected with the mobile terminal A by a handover continuously transmits the busy tone to the mobile terminal A regardless of whether or not an own device is in the congestion state, that is, even when the network control device B is not in the congestion state (step S14). When the mobile terminal A performs an on-hook operation (step S15a), or when the network control device B performs cut-off processing due to a time out of the busy tone transmission time (step S15b), the connection between the mobile terminal A and the network control device B is cut off.

As described above, in the conventional system, even in the case in which the mobile terminal moves and performs a handover to the network control device which is not in the congestion state during transmission of the busy tone, the network control device continuously transmits the busy tone. Therefore, when encountering the congestion state, the user of the mobile terminal has to repeat action of cutting off a communication request to the network control device, moving to an appropriate place and checking whether or not the mobile terminal can connect with a network, and thus it is inconvenient.

SUMMARY

According to an aspect of an embodiment of the invention, a network control device for controlling a call connection between a calling party terminal and a called party terminal includes a state determining unit that determines whether the own network control device is in a congestion state when a handover request is acquired from another network control device which is in the congestion state; and a call connection processing unit that stops transmitting a busy tone to the calling party terminal and transmits a ring back tone when the state determining unit determines that the own network control device is not in the congestion state.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 12 is a sequence diagram illustrating the flow of processing when a mobile terminal of a calling party which is receiving a busy tone is handed over to a different network control device.

DESCRIPTION OF EMBODIMENT(S)

Preferred embodiments of the present invention will be explained with reference to accompanying drawings.

The present invention is not limited to the exemplary embodiments.

Figure 1:
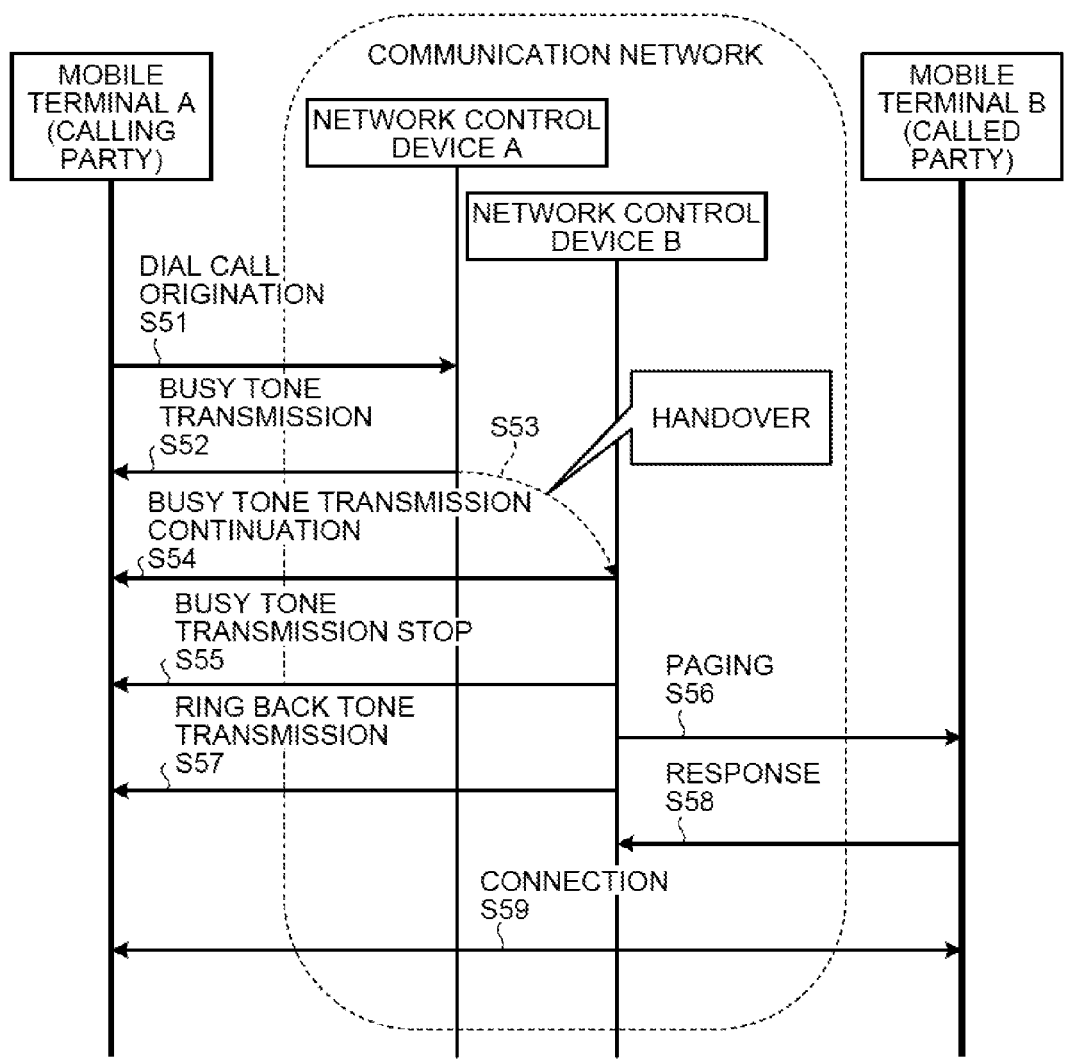
FIG. 1 is a view for explaining a network control method according to the present exemplary embodiment.

First, a network control method according to the present exemplary embodiment is explained. FIG. 1 is a view for explaining a network control method according to the present exemplary embodiment. In the network control method according to the present exemplary embodiment, when a mobile terminal of a calling party encounters congestion of a communication network, a communication request to a network control device is not cut off, and the mobile terminal of the calling party is connected with a mobile terminal of a called party.

Specifically, as illustrated in FIG. 1, a mobile terminal A as the mobile terminal of the calling party performs a dial call origination and requests a network control device A to establish a call connection with a mobile terminal B as the mobile terminal of the called party (step S51). Subsequently, when the call connection between the mobile terminal A and the mobile terminal B cannot be established due to congestion, the network control device A which received dial call origination from the mobile terminal A transmits the busy tone to the mobile terminal A (step S52). The call connection represents that, based on the dial call origination by the mobile terminal of the calling party (hereinafter, referred to as "calling party terminal"), lines of the calling party terminal and the mobile terminal of the called party (hereinafter, referred to as "called party terminal") are connected with each other. Also, the busy tone represents a sound which is transmitted to the calling party terminal to inform the user of the calling party terminal of that speech communication with the called party terminal is impossible due to congestion of the communication network.

Here, if the mobile terminal A moves from a base station area managed by the network control device A which is in the congestion state to a base station area managed by a network control device B, handover processing is performed between the network control device A and the network control device B (step S53). The handover represents that the network control device which connects with the mobile terminal is changed.

At this time, the network control device B connected with the mobile terminal A by a handover continuously transmits the busy tone (step S54) and determines whether or not the own device is in the congestion state. When it is determined that the own device is not in the congestion state, the network control device B stops transmitting the busy tone (step S55), pages the mobile terminal B (step S56), and transmits the ring back tone to the mobile terminal A (step S57). The ring back tone represents a sound which is transmitted to the calling party to inform the user of the calling party terminal of that it is being tried to page the user of the called party terminal.

When the mobile terminal B does not perform speech communication but is in the connectable state, the network control device A receives a response that represents that speech communication is possible from the mobile terminal B (step S58) and establishes the call connection between the mobile terminal A and the mobile terminal B (step S59). Therefore, the mobile terminal A and the mobile terminal B enter a speech communication enable state.

As described above, according to the network control method of the present exemplary embodiment, when a handover request is acquired from a different network control device which is in the congestion state, the network control device determines whether or not the own device is in the congestion state. When it is determined that the own device is not in the congestion state, it is stopped to transmit the busy tone to the calling party terminal, and the ring back tone is transmitted. Therefore, even in the case of encountering congestion of the communication network, if moving into the base station area of the different network control device which is not in the congestion state during transmission of the busy tone, the user of the mobile terminal can continuously request communication to the network control device without performing a re-dial call origination.

Figure 2:
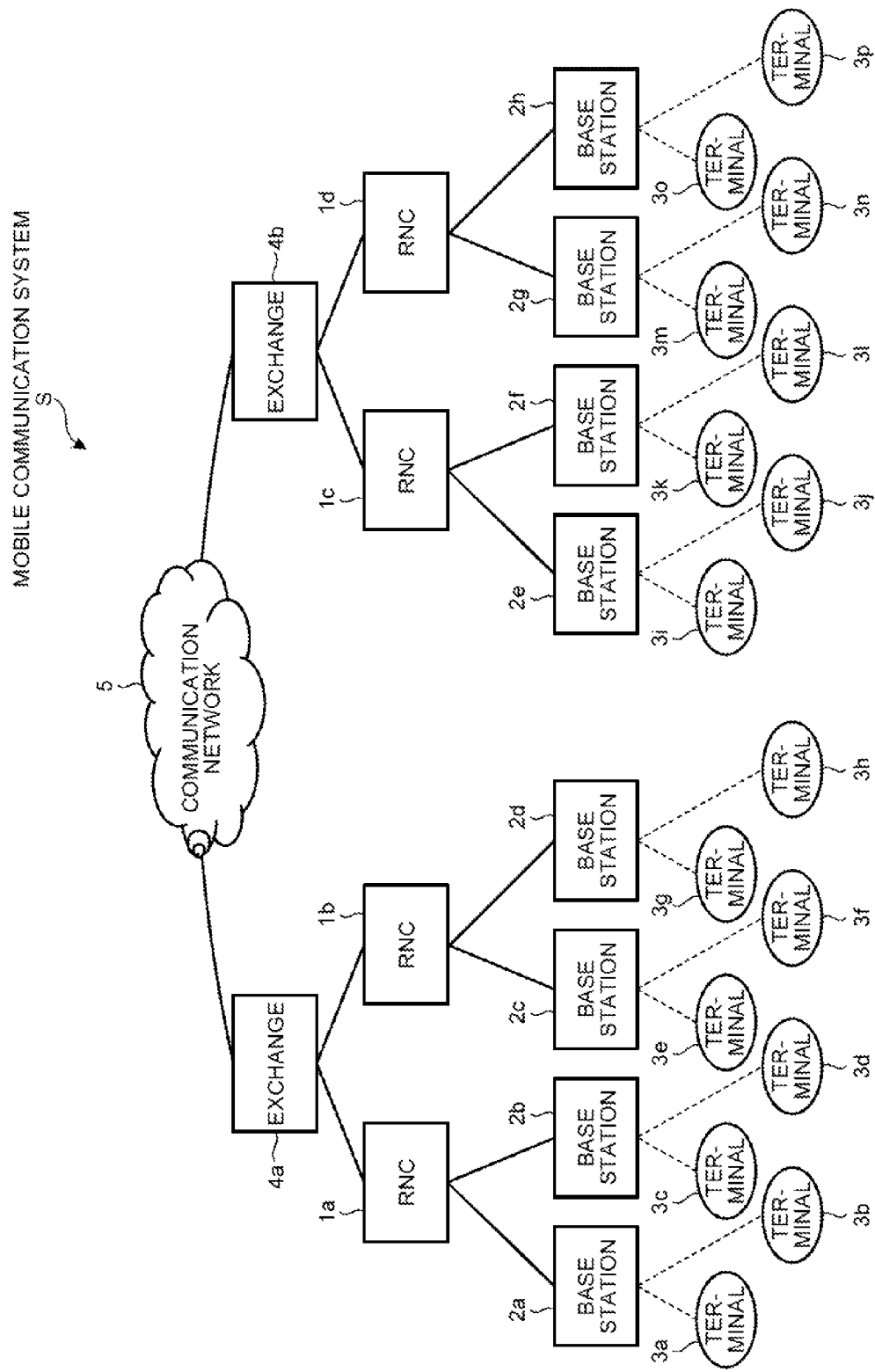
FIG. 2 is a view illustrating a configuration of a mobile communication system according to the present exemplary embodiment.

Next, a mobile communication system according to the present exemplary embodiment is explained. FIG. 2 is a view illustrating a configuration of a mobile communication system according to the present exemplary embodiment. In the present exemplary embodiment, the case in which a radio network controller (RNC) which centrally controls a plurality of base stations is applied as an example of a network control device is explained.

As illustrated in FIG. 2, a mobile communication system S according to the present exemplary embodiment includes RNCs 1a to 1d, base stations 2a to 2h, mobile terminals 3a to 3p, and exchanges 4a and 4b. The RNCs 1a to 1d are network control devices which perform various pieces of control for implementing wireless communication between the calling party terminal and the called party terminal. Specifically, the RNCs 1a to 1d centrally control the plurality of base stations 2a to 2h and perform call connection control, congestion control, and handover control. In the present exemplary embodiment, the RNC 1a is connected with the base stations 2a to 2b and controls the base stations 2a and 2b. The RNC 1b is connected with the base stations 2c to 2d and controls the base stations 2c and 2d. The RNC 1c is connected with the base stations 2e to 2f and controls the base stations 2e and 2f. The RNC 1d is connected with the base stations 2g to 2h and controls the base stations 2g and 2h.

The base stations 2a to 2h are devices which communicate directly with the mobile terminals 3a to 3p which are present in their areas. The base stations 2a to 2h are mostly installed on telephone poles, rooftops of buildings, and ceilings of subway homes. The base stations 2a to 2h communicate with the RNCs 1a to 1d which are connected with their own devices, respectively.

The mobile terminals 3a to 3p (hereinafter, referred to as simply "terminals 3a to 3p") are handheld wireless communication devices which perform wireless communication, for example, mobile telephone terminals. In the present exemplary embodiment, the terminals 3a and 3b are located in an area of the base station 2a, the terminals 3c and 3d are located in an area of the base station 2b, the terminals 3e and 3f are located in an area of the base station 2c, and the terminals 3g and 3h are located in an area of the base station 2d. Similarly, the terminals 3i and 3j are located in an area of the base station 2e, the terminals 3k and 3l are located in an area of the base station 2f, the terminals 3m and 3n are located in an area of the base station 2g, and the terminals 3o and 3p are located in an area of the base station 2h.

The exchanges 4a and 4b are device for connecting telephone lines with each other to configure a telephone network and mange the plurality of RNCs 1a to 1d. Specifically, the exchange 4a is connected with the RNC 1a and the RNC 1b and manages the RNC 1a and the RNC 1b. The exchange 4b is connected with the RNC 1c and the RNC 1d and manages the RNC 1c and the RNC 1d. The exchange 4a and the exchange 4b are connected with each other via a communication network 5.

Hereinafter, an arbitrary RNC of the RNCs 1a to 1d is referred to as simply "RNC 1", an arbitrary base station of the base stations 2a to 2h is referred to as simply "base station 2", an arbitrary terminal of the terminals 3a to 3p is referred to as simply as "terminal 3, and an arbitrary exchange of the exchanges 4a and 4b is referred to as simply "exchange 4".

Figure 3:
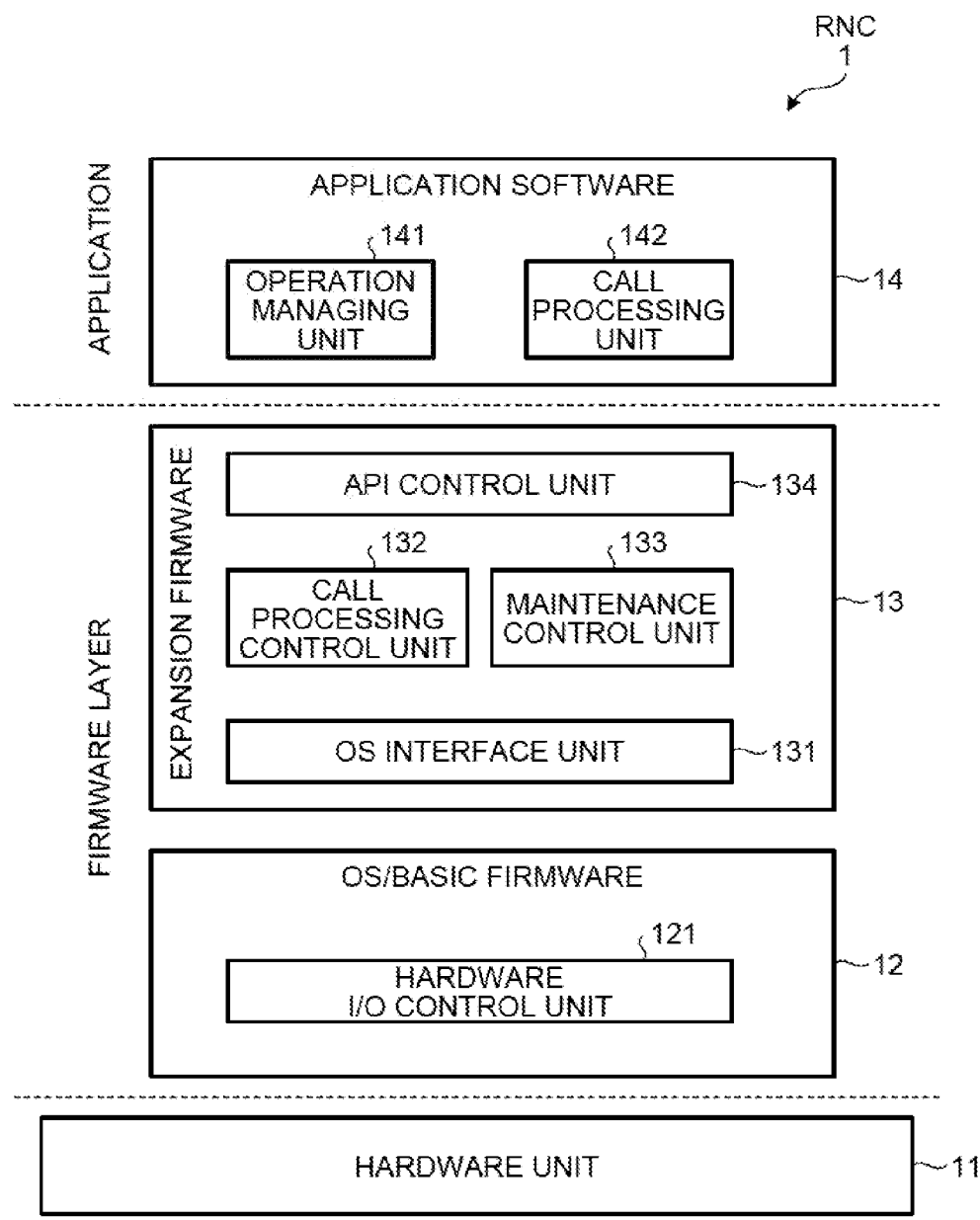
FIG. 3 is a block diagram illustrating a configuration of a RNC according to the present exemplary embodiment.

Next, a configuration of the RNC 1 according to the present exemplary embodiment is explained. FIG. 3 is a block diagram illustrating a configuration of the RNC 1 according to the present exemplary embodiment. As illustrated in FIG. 3, the RNC 1 according to the present exemplary embodiment includes an OS/basic firmware 12, an expansion firmware 13, and application software 14 which are installed in a hardware unit 11. The hardware unit 11 includes a central processing unit (CPU) which performs various pieces of arithmetic processing, a random access memory (RAM) which temporarily stores various pieces of information, a read only memory (ROM), a had disk device, and a communication interface which performs an exchange of various pieces of information between the base station 2 and the exchange 4.

The OS/basic firmware 12 is software which is installed in the RNC 1 to perform basic control of the RNC. The OS/basic firmware 12 is stored, for example, in the ROM of the hardware unit 11. The OS/basic firmware 12 includes an operating system (OS) and a hardware input/output (I/O) control unit 121. The hardware I/O control unit 121 is an interface for controlling an input to the hardware unit 11 and an output from the hardware unit 11.

The expansion firmware 13 is software which is installed in the RNC 1 to perform basic processing as the RNC and stored in the ROM of the hardware unit 11 similarly to the OS/basic firmware 12. The expansion firmware 13 includes an OS interface unit 131, a call processing control unit 132, a maintenance control unit 133, and an application program interface (API) control unit 134. The OS interface unit 131 is an interface for controlling communication with the OS included in the OS/basic firmware 12.

The call processing control unit 132 mainly establishes or disconnects communication between the calling party terminal and the called party terminal, that is, performs processing related to the call connection between the calling party terminal and the called party terminal. For example, when a control path connection request is acquired from the calling party terminal, the call processing control unit 132 connects a control path with the calling party terminal or transmits a control path connection completion notice to the calling party terminal. Further, the call processing control unit 132 performs processing of changing a connection destination of the control path based on a handover request from a different RNC 1.

The maintenance control unit 133 mainly manages information related to the own device such as identification information and state information of the RNC 1 and performs congestion control. Specially, the maintenance control unit 133 manages information as to whether or not the RNC 1 is in the congestion state as the state information of the RNC 1. The API control unit 134 is an interface for linking the expansion firmware 13 with the application software 14 and executes the call processing control unit 132 or the maintenance control unit 133 based on various commands acquired from the application software 14.

The application software 14 is software which is installed in the RNC 1 to implement a function as a network control device according to the present exemplary embodiment and stored, for example, in a hard disk of the hardware unit 11. The application software 14 includes an operation managing unit 141 and a call processing unit 142. The operation managing unit 141 transmits a command to the call processing control unit 132 or the maintenance control unit 133 through the API control unit 134 based on various requests from the base station 2 or the exchange 4 or an instruction from the call processing unit 142.

Figure 4:
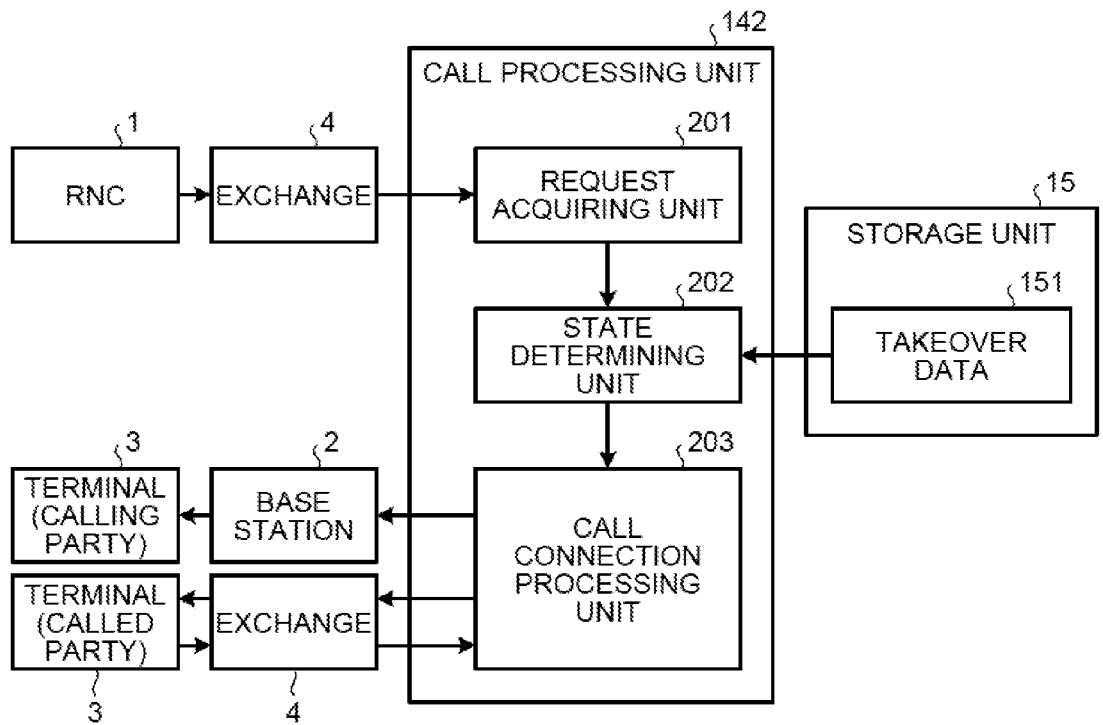
FIG. 4 is a block diagram of a concrete configuration of a call processing unit according to the present exemplary embodiment.

The call processing unit 142 is a control unit which controls execution of processing by the call processing control unit 132 or the maintenance control unit 133. A concrete configuration of the call processing unit 142 according to the present exemplary embodiment is explained below. FIG. 4 is a block diagram of a concrete configuration of the call processing unit according to the present exemplary embodiment.

Figure 5:
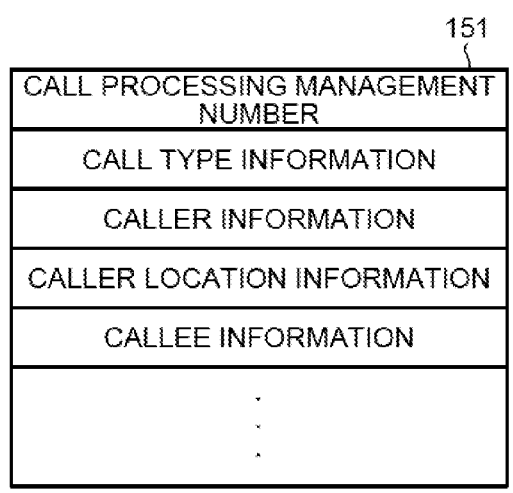
FIG. 5 is a view illustrating an example of takeover data.

As illustrated in FIG. 4, the call processing unit 142 according to the present exemplary embodiment includes a request acquiring unit 201, a state determining unit 202, and a call connection processing unit 203. The request acquiring unit 201 acquires the handover request from the RNC 1 other than the own device through the exchange 4. The request acquiring unit 201 acquires takeover data 151 together with the handover request. The takeover data 151 is information necessary for performing handover processing and stored in a storage unit 15 such as a hard disk included in the hardware unit 11. FIG. 5 illustrates an example of the takeover data 151.

As illustrated in FIG. 5, the takeover data 151 includes a call processing management number, call type information, caller information, caller location information, and callee information. The call processing management number is an identification number for identifying the takeover data 151. The call type information is information representing a type of the connection state between the RNC 1 which transmitted the handover request and the calling party terminal 3. For example, the call type information includes "during a voice call", "during transmission of the ring back tone", and "during transmission of the busy tone". The caller information is a telephone number of the calling party terminal. The caller location information is information for specifying a location of the calling party terminal. The callee information is a telephone number of the called party terminal.

When the handover request is acquired from a different RNC 1 which is in the congestion state, the state determining unit 202 determines whether or not the own device is in the congestion state. Specifically, when the request acquiring unit 201 acquires the handover request from the different RNC 1, the state determining unit 202 determines whether or not the different RNC 1 is in the congestion state based on the call type information included in the takeover data 151 acquired together with the handover data from the different RNC 1. That is, when the call type information included in the acquired takeover data 151 is "during transmission of the busy tone", the request acquiring unit 201 determines that the different RNC 1 which transmitted the handover request is in the congestion state.

When it is determined that the different RNC 1 which transmitted the handover request is in the congestion state, the state determining unit 202 determines whether or not the own device is in the congestion state based on the state information managed by the maintenance control unit 133. Specifically, in order to determine whether or not the own device is in the congestion state, the state determining unit 202 instructs the operation managing unit 141 to transmit a command for inquiring about a state of the own device to the maintenance control unit 133. The state determining unit 202 refers to the state information of the own device which the operation managing unit 141 acquired from the maintenance control unit 133 and determines whether or not the own device is in the congestion state.

When the handover request is acquired from the RNC which is in the congestion state, the call processing unit 142 transmits a command to the call processing control unit 132 to transmit the busy tone to the called party terminal 3. Therefore, the busy tone is continuously transmitted to the calling party terminal 3 even after the handover.

When the state determining unit 202 determines that the own device is not in the congestion state, the call connection processing unit 203 stops transmitting the busy tone to the calling party terminal 3 and transmits the ring back tone. Specifically, when the state determining unit 202 determines that the own device is not in the congestion state, the call connection processing unit 203 first instructs the call processing control unit 132 to request the exchange 4 connected with the own device to establish the call connection with the called party terminal 3. When a notice representing that the connection with the called party terminal 3 was completed is received from the exchange 4, the call connection processing unit 203 instructs the call processing control unit 132 to stop transmitting the busy tone while instructing the call processing control unit 132 to transmit the ring back tone.

Figure 6:
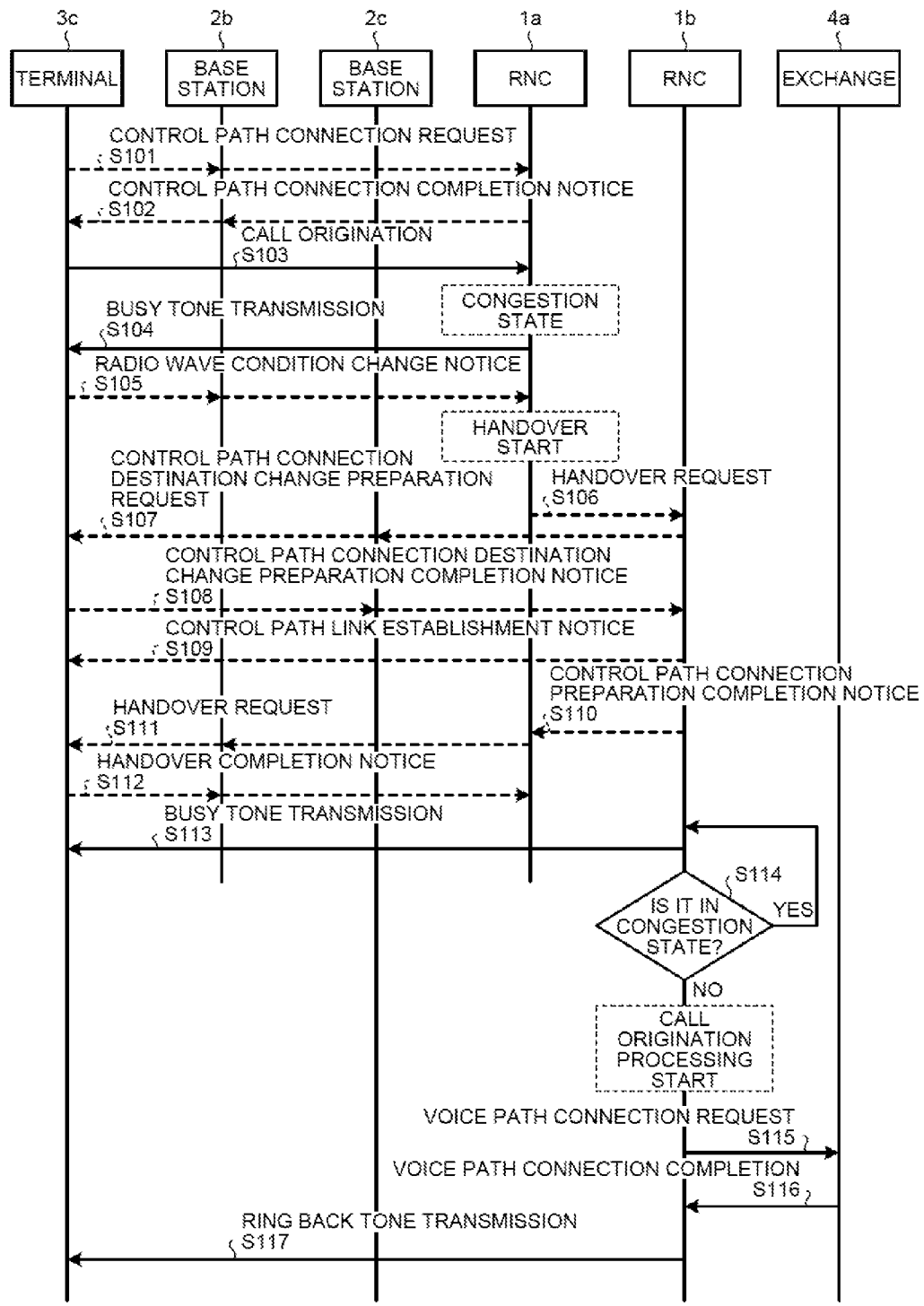
FIG. 6 is a sequence diagram for explaining concrete processing of a mobile communication system according to the present exemplary embodiment.

Next, concrete processing of the mobile communication system S according to the present exemplary embodiment is explained. FIG. 6 is a sequence diagram for explaining concrete processing of the mobile communication system S according to the present exemplary embodiment. Hereinafter, the terminal 3c is explained as the calling party terminal, and the terminal 3k is explained as the called party terminal.

As illustrated in FIG. 6, in order to establish the call connection with the terminal 3k as the called party terminal, the terminal 3c as the calling party terminal first transmits a control path connection request to the RNC 1a through the base station 2b (step S101). The control path connection request is a signal which the calling party terminal transmits to the RNC 1 in order to connect the calling terminal party with the RNC 1. Subsequently, the RNC 1a which acquired the control path connection request from the terminal 3c performs processing of connecting the control path with the terminal 3c and then notifies the terminal 3c of that the connection of the control path was completed (step S102).

Subsequently, the terminal 3c originates a call to the RNC 1a through the base station 2b (step S103). Specifically, the terminal 3c transmits information such as telephone number information of the called party terminal 3k to the RNC 1a. When the call origination is received from the terminal 3c, the RNC 1a typically performs processing of connecting the control path with the called party terminal 3k, but when it is impossible to connect to the communication network 5 in which the own device is in the congestion state, the busy tone is transmitted to the terminal 3c (step S104).

Here, it is assumed that the terminal 3c moved from an area of the base station 2b managed by the RNC 1a which is in the congestion state to an area of the base station 2c managed by the RNC 1b. In this case, the terminal 3c transmits a radio wave condition change notice to the RNC 1a through the base station 2b (step S105). The radio wave condition change notice is a notice which requests the RNC 1, which manages an area in which the calling party terminal 3 was located, to perform handover processing and includes location information of the calling party terminal 3. The RNC 1a which acquired the radio wave condition change notice from the terminal 3c specifies the RNC 1b, which manages an area in which the terminal 3c is located, based on the location information of the terminal 3c included in the radio wave condition change notice and transmits the handover request to the RNC 1b through the exchange 4a (step S106). The RNC 1a transmits the takeover data 151 to the RNC 1b together with the handover request.

When the handover request is acquired from the RNC 1a, the RNC 1b transmits a request representing that it has to prepare a control path connection destination change from the RNC 1a to the RNC 1b to the terminal 3c through the base station 2c (step S107). Subsequently, the terminal 3c prepares the control path connection destination change from the RNC 1a to the RNC 1b based on the request from the RNC 1b and then transmits a notice representing that the control path connection destination change preparation was completed to the RNC 1b through the base station 2c (step S108). The RNC 1b establishes a control path link with the terminal 3c (step S109).

Subsequently, the RNC 1b notifies the RNC 1a of that the control path connection preparation was completed (step S110). When the notice is received, the RNC 1a requests the terminal 3c through the base station 2b to perform a handover (step S111). The terminal 3c transmits a notice representing that the handover was completed to the RNC 1a through the base station 2b (step S112).

Subsequently, the RNC 1b transmits the busy tone to the terminal 3c based on the call type information included in the takeover data 151 transmitted together with the handover request in step S106 (step S113). Subsequently, the RNC 1b determines whether or not the own device is in the congestion state (step S114). When it is determined in this processing that the own device is in the congestion state (Yes in step S114), the RNC 1b continuously transmits the busy tone. However, when it is determined that the own device is not in the congestion state (No in step S114), the RNC 1b starts call origination processing. Specifically, the RNC 1b requests the exchange 4a connected with the own device to establish the call connection with the called party terminal 3k (step S115).

When a notice representing that the connection with the called party terminal 3k was established is received from the exchange 4a (step S116), the RNC 1b stops transmitting the busy tone to the terminal 3c and transmits the ring back tone to the terminal 3c (step S117).

As described above, in the mobile communication system S according to the present exemplary embodiment, when the calling party terminal moved into the base station area managed by the different RNC 1 which is not in the congestion state during transmission of the busy tone, the different RNC 1 stops transmitting the busy tone, resumes the call connection with the called party terminal, and transmits the ring back tone.

Figure 7:
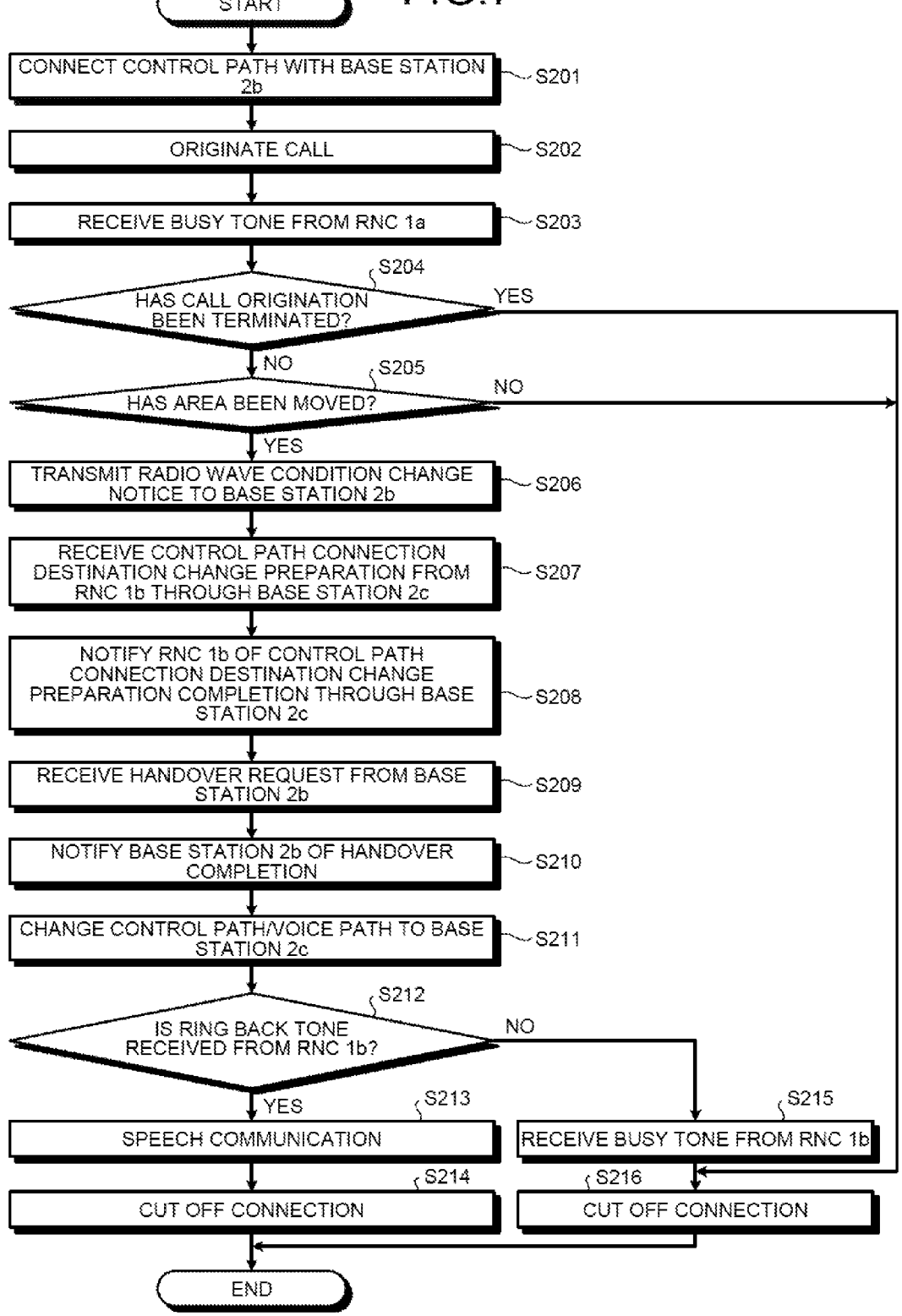
FIG. 7 is a flowchart illustrating a processing procedure by a mobile terminal according to the present exemplary embodiment.

Next, a concrete operation of the terminal 3c as the calling party terminal according to an exemplary embodiment is explained. FIG. 7 is a flowchart illustrating a processing procedure by a mobile terminal according to the present exemplary embodiment.

As illustrated in FIG. 7, in order to perform communication with the terminal 3k as the called party terminal, the terminal 3c first transmits the control path connection request to the base station 2b (step S201). The control path connection request transmitted to the base station 2b is transmitted to the RNC 1a by the base station 2b. Subsequently, the terminal 3c requests the RNC 1a through the base station 2b to originate a call to the terminal 3k (step S202).

Subsequently, when the busy tone is received from the RNC 1a through the base station 2b (step S203), the terminal 3c determines whether or not the call origination was terminated (step S204). Specifically, such determination is made by whether or not an on-hook was performed by the user of the terminal 3c. When it is determined in this processing that the call origination was terminated (Yes in step S204), the terminal 3c shifts processing to step S216. However, when the call origination is not terminated (No in step S204), the terminal 3c shifts processing to step S205.

In step S205, the terminal 3c determines whether or not an area was moved. When it is determined in this processing that an area was not moved (No in step S205), the terminal 3c shifts processing to step S216. However, when it is determined that an area was moved (Yes in step S205), the terminal 3c transmits the radio wave condition change notice to the base station 2b (step S206). The radio wave condition change notice transmitted to the base station 2b is transmitted to the RNC 1a by the base station 2b.

Subsequently, the terminal 3c receives a request representing that it has to prepare a control path connection destination change from the RNC 1b through the base station 2c (step S207). Subsequently, the terminal 3c prepares the control path connection destination change based on the request and then notifies the RNC 1b of that control path connection destination change preparation was completed through the base station 2c (step S208).

Subsequently, when the handover request is acquired from the base station 2b (step S209), the terminal 3c notifies the base station 2b of handover completion (step S210). The handover completion notice transmitted to the base station 2b is transmitted to the RNC 1a by the base station 2b. The terminal 3c changes a control path/a voice path to the base station 2c (step S211).

Subsequently, the terminal 3c determines whether or not the ring back tone was received from the RNC 1b through the base station 2b (step S212). When it is determined in this processing that the ring back tone was received from the RNC 1b (Yes in step S212), the terminal 3c performs speech communication with the terminal 3k as the called party terminal (step S213). When the user of the terminal 3c performs an on-hook operation or when the user of the terminal 3k performs an on-hook operation, the terminal 3c cuts off the connection with the terminal 3k (step S214).

However, when it is determined in step S212 that the ring back tone was not received from the RNC 1b (No in step S212), the terminal 3c continuously receives the busy tone from the RNC 1b (step S215). When the user of the terminal 3c performs an on-hook operation or when the connection is cut off from the RNC 1b due to a time out of a busy tone transmission time, the terminal 3c cuts off the connection with the RNC 1b (step S216). When processing of step S214 or step S216 is finished, the terminal 3c finishes processing as the calling party terminal.

Figure 8:
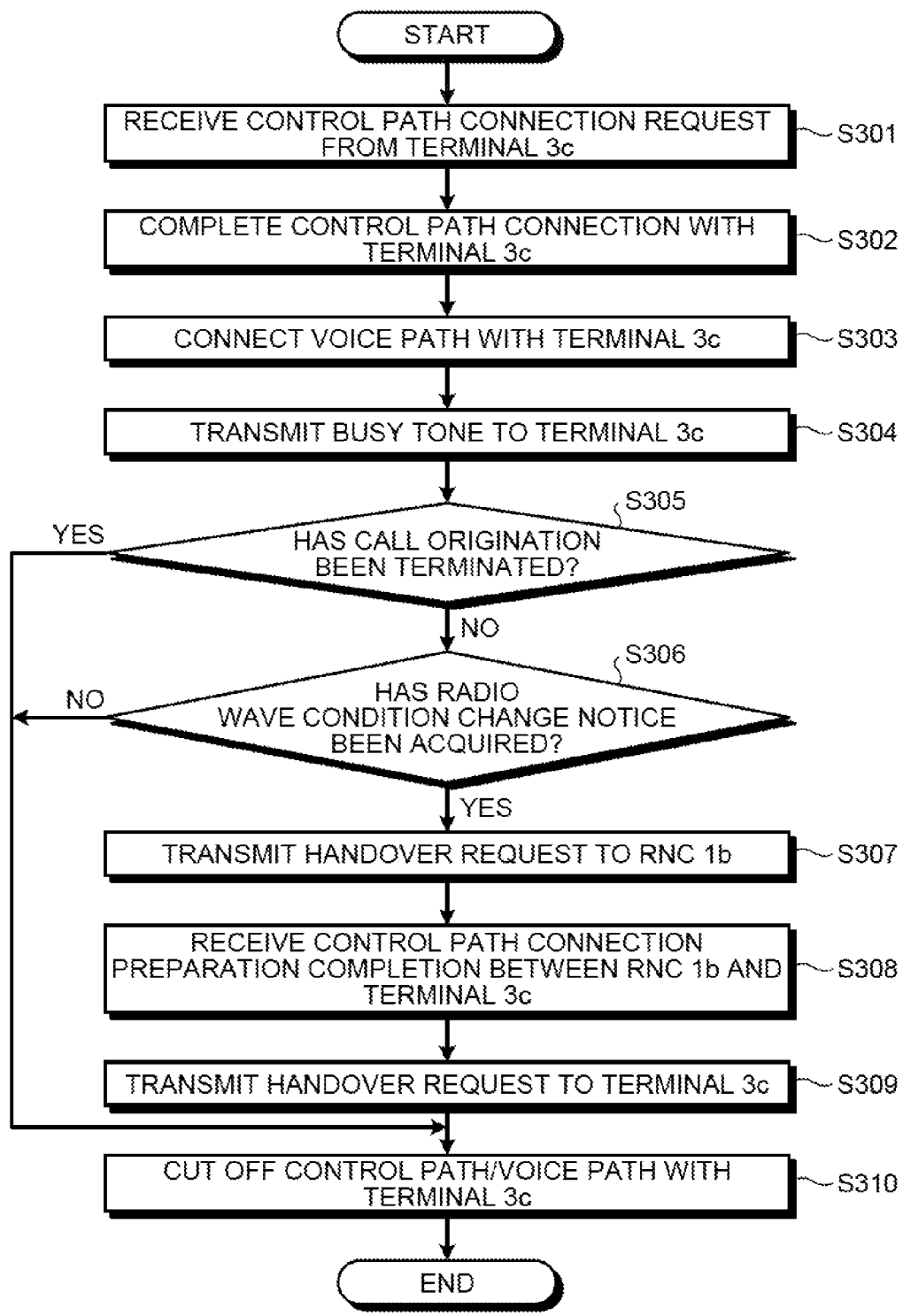
FIG. 8 is a flowchart illustrating a processing procedure of a RNC when transmitting a handover request.

Next, a concrete operation of the RNC 1 according to the present exemplary embodiment is explained. First, a concrete operation of the RNC 1 when transmitting the handover request to the different RNC 1 in the congestion state is explained. FIG. 8 is a flowchart illustrating a processing procedure of the RNC when transmitting the handover request. The following processing is performed based on a command which the call processing control unit 132 or the maintenance control unit 133 receives from the call processing unit 142, but for simplification of description, it is assumed that the processing is performed by the call processing unit 142.

As illustrated in FIG. 8, when the control path connection request is received from the terminal 3c as the calling party terminal (step S301), the call processing unit 142 of the RNC 1a connects the control path with the terminal 3c and then notifies the terminal 3c through the base station 2b of that the connection of the control path was completed (step S302). Subsequently, the call processing unit 142 connects the voice path with the terminal 3c (step S303). The call processing unit 142 transmits the busy tone to the terminal 3c since the own device is in the congestion state (step S304).

Subsequently, the call processing unit 142 determines whether or not the call origination was terminated (step S305). Such determination is made by whether or not a time out of a busy tone transmission time occurred. When it is determined in this processing that the call origination was not terminated (No in step S305), the call processing unit 142 determines whether or not the radio wave condition change notice was acquired from the terminal 3c through the base station 2b (step S306). When it is determined in this processing that the radio wave condition change notice was acquired from the terminal 3c (Yes in step S306), the call processing unit 142 transmits the handover request to the RNC 1b through the exchange 4a based on the location information of the terminal 3c included in the radio wave condition change notice (step S307). In this processing, the RNC 1a transmits the takeover data 151 to the RNC 1b together with the handover request.

Subsequently, the call processing unit 142 receives a notice representing that control path connection preparation was completed from the RNC 1b through the exchange 4 (step S308). Then, when the notice is received, the call processing unit 142 transmits the handover request to the terminal 3c through the base station 2b (step S309). When processing of step S309 was finished, when it is determined in step S305 that the call origination was terminated (Yes in step S305), or when it is determined in step S306 that the radio wave condition change notice was not acquired (No in step S306), the control path and the voice path connected with the terminal 3c are cut off (step S310). When this processing is finished, the call processing unit 142 of the RNC 1a finishes processing when transmitting the handover request in the congestion state.

Figure 9:
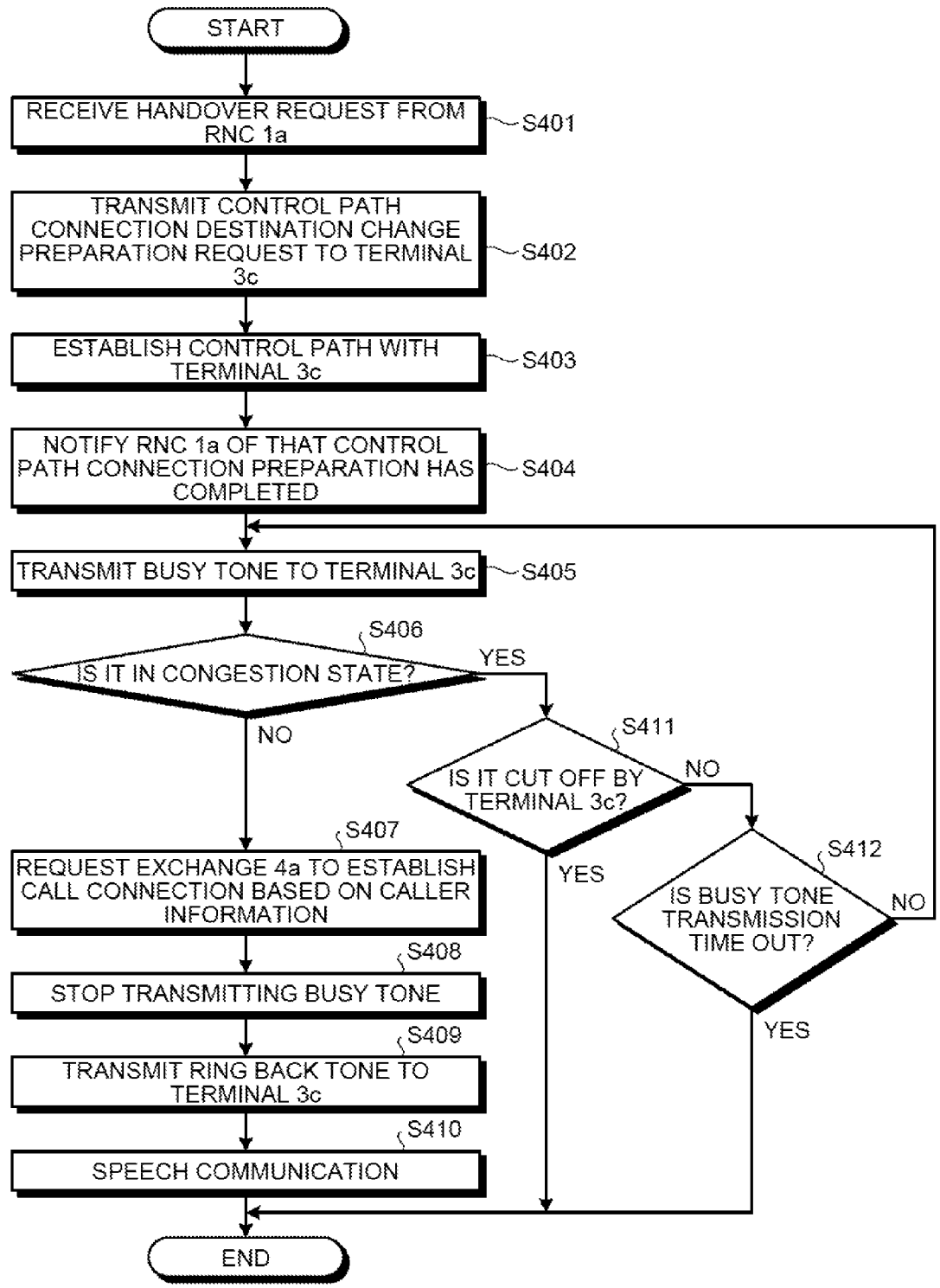
FIG. 9 is a flowchart illustrating a processing procedure of a RNC when receiving a handover request.

Next, a concrete operation of the RNC 1 when receiving the handover request from the RNC 1 which is in the congestion state is explained. FIG. 9 is a flowchart illustrating a processing procedure of the RNC when receiving the handover request.

As illustrated in FIG. 9, the request acquiring unit 201 of the RNC 1b acquires the handover request and the takeover data 151 from the RNC 1a (step S401). Subsequently, the call processing unit 142 transmits a request representing that it has to prepare the control path connection destination change from the RNC 1a to the RNC 1b to the terminal 3c through the base station 2c (step S402). Then, when the notice representing that control path connection destination change preparation was completed is acquired from the terminal 3c through the base station 2c, the call processing unit 142 connects the control path with the terminal 3c and establishes the control path link with the terminal 3c (step S403).

Subsequently, the call processing unit 142 notifies the RNC 1a of that the control path connection preparation was completed (step S404). Then, the call processing unit 142 refers to the call type information included in the takeover data 151 received in step S401 and transmits the busy tone to the terminal 3c since the call type information is "during transmission of the busy tone" (step S405).

Subsequently, the state determining unit 202 determines whether or not the own device is in the congestion state (step S406). Specifically, the state determining unit 202 determines whether or not the own device is in the congestion state based on the state information managed by the maintenance control unit 133. That is, in order to determine whether or not the own device is in the congestion state, the state determining unit 202 instructs the operation managing unit 141 to transmits a command for inquiring about a state of the own device to the maintenance control unit 133. The state determining unit 202 refers to the state information of the own device which the operation managing unit 141 acquired from the maintenance control unit 133 and determines whether or not the own device is in the congestion state.

When it is determined in this processing that the own device is not in the congestion state (No in step S406), the call connection processing unit 203 requests the exchange 4a connected with the own device to establish the call connection with the terminal 3k as the called party terminal based on the callee information included in the takeover data 151 acquired in step S401 (step S407). Subsequently, the call connection processing unit 203 stops transmitting the busy tone to the terminal 3c (step S408) and transmits the ring back tone to the terminal 3c through the base station 2c (step S409). When the terminal 3k does not perform speech communication but is in the connectable state, the call connection processing unit 203 receives a response representing that speech communication is possible from the terminal 3k through the exchange 4 and makes the terminal 3c and the terminal 3k enter a speech communication state (step S410).

When it is determined in step S406 that the own device is in the congestion state (Yes in step S406), the call processing unit 142 determines whether or not the connection was cut off by the on-hook operation of the terminal 3c (step S411). When it is determined in this processing that the connection was not cut off by the terminal 3c (No in step S411), the call processing unit 142 determines whether or not a time out of a busy tone transmission time occurred (step S412). When it is determined in this processing that a time out of a busy tone transmission time did not occur (No in step S412), the call processing unit 142 shifts processing to step S405.

When processing of step S410 is finished, when it is determined in step S411 that the connection was cut off by the terminal 3c (Yes in step S411), or when it is determined in step S412 that a time out of the busy tone transmission time occurred (Yes in step S412), the call processing unit 142 finishes processing when receiving the handover request from the RNC 1 which is in the congestion state.

As described above, in the present exemplary embodiment, when the handover request is acquired from the different RNC 1 which is in the congestion state, the RNC 1 determines whether or not the own device is in the congestion state. When it is determined that the own device is not in the congestion state, the RNC 1 stops transmitting the busy tone to the calling party terminal and transmits the ring back tone. Therefore, even when encountering congestion of the communication network 5, if moving into a base station area of the different network control device which is not in the congestion state during transmission of the busy tone, the user of the mobile terminal can continuously request communication to the RNC 1 without performing the re-dial call origination. Further, according to the present exemplary embodiment, since the unnecessary re-dial call origination in the congestion state is reduced, incomplete calls can be reduced, and it can be avoided to prolong the congestion state.

Figure 10:
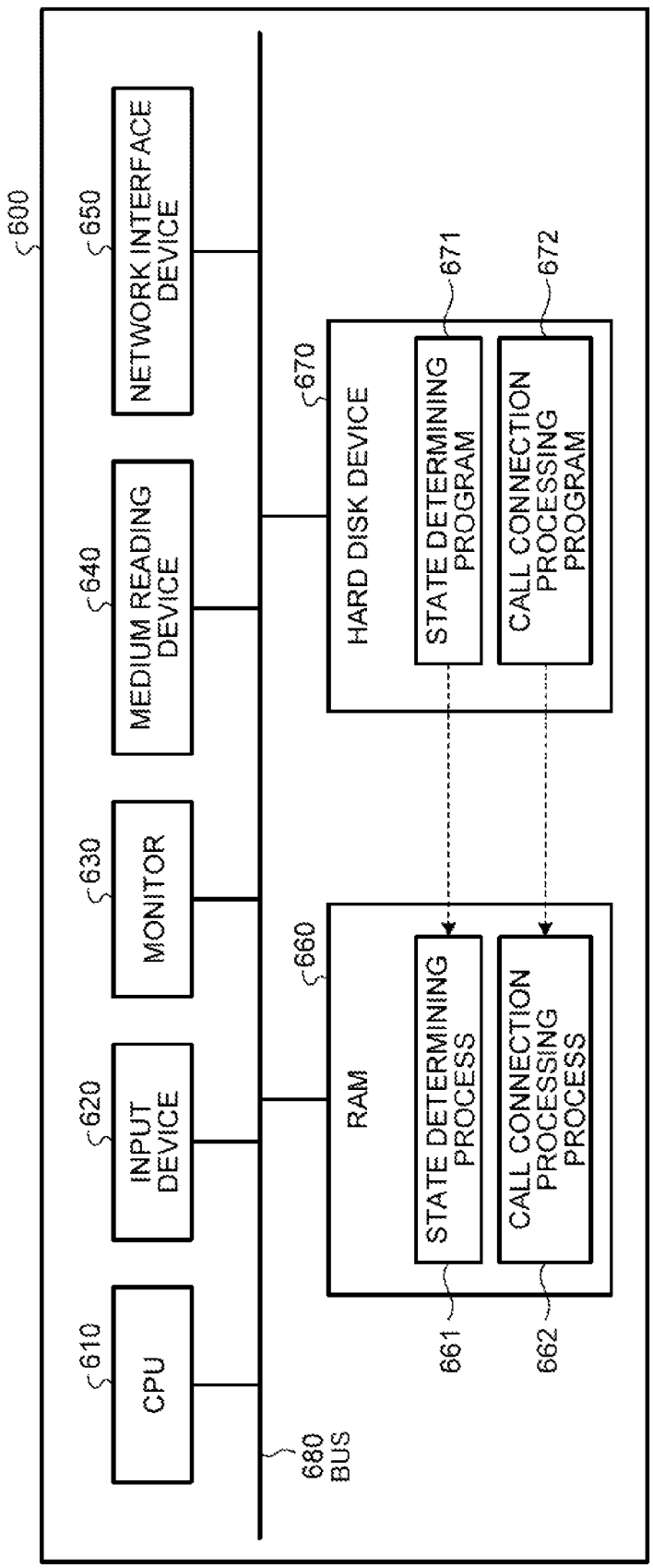
FIG. 10 is a functional block diagram illustrating a computer which executes a network control program.
Figure 11:
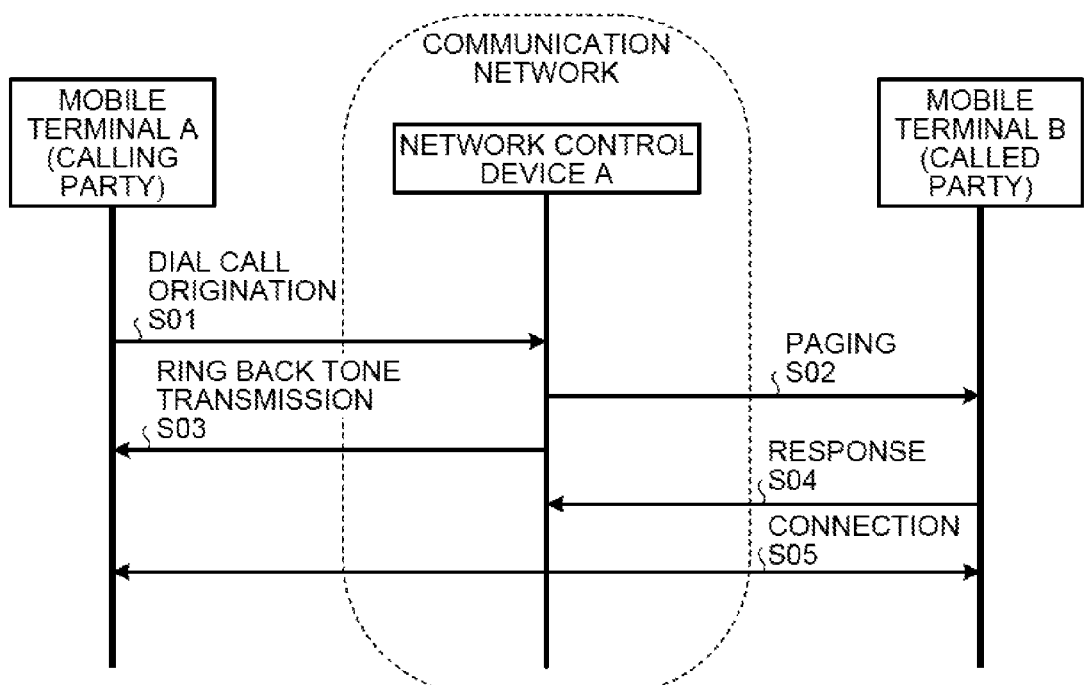
FIG. 11 is a sequence diagram illustrating the flow of processing until a mobile terminal of a calling party connects with a mobile terminal of a called party.

A function of the RNC 1 may be mounted as software, and the software may be executed by a computer, so that the same function as the RNC 1 can be implemented. An example of the computer which executes a network control program in which a function of the RNC 1 is mounted as software is explained below. FIG. 10 is a view illustrating a computer which executes a network control program.

A computer 600 includes a CPU 610 which executes various pieces of arithmetic processing, an input device 620 which receives data from a user, and a monitor 630 which displays various pieces of information. The computer 600 further includes a medium reading device 640 which reads a program from a recording medium and a network interface device 650 which exchanges data with a different computer through a network. The computer 600 further includes a RAM 660 which temporarily stores various pieces of information and a hard disk device 670. The computer 600 connects the above-mentioned components with each other via a bus 680.

The hard disk device 670 stores network control programs which perform the same function as in the above-described exemplary embodiments, that is, a state determining program 671 and a call connection processing program 672.

The CPU 610 reads the state determining program 671 and the call connection processing program 672 from the hard disk device 670 and expands them in the RAM 660, so that the programs 671 and 672 function as a state determining process 661 and a call connection processing process 662, respectively.

The state determining program 671 and the call connection processing program 672 do not need to be necessarily stored in the hard disk device 670. The computer 600 may read and execute the programs stored in a storage medium such as a CD-ROM. The programs may be stored in a different computer or a server connected to the computer 600 via a public line, an Internet, a local area network (LAN), or a wide area network (WAN), and the computer 600 may read and execute the programs from them.

According to an aspect of the network control device, the network control program, and the network control method of the present invention, there is an effect of being capable of connecting the mobile terminal of the calling party which encountered congestion of the communication network with the mobile terminal of the called party without cutting off the communication request to the network control device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A network control device for controlling a call connection between a calling party terminal and a called party terminal, comprising:
    a state determining unit that determines whether the own network control device is in a congestion state and whether another network control device is in the congestion state, the own network control device being a handover target device and the another network control device being a handover source device; and
    a call connection processing unit that
        (a) stops transmitting a busy tone to the calling party terminal when the another network control device is in the congestion state and the own network control device is not in the congestion state,
        (b) continues to transmit the busy tone to the calling party terminal when the another network control device and the own network control device are in the congestion state, and
        (c) newly starts to transmit a ring back tone when the call connection processing unit stops transmitting the busy tone.

2. The network control device according to claim 1, wherein the call connection processing unit requests an exchange connected with the own network control device to establish a call connection with the called party terminal when the own network control device is not in the congestion state, and stops transmitting the busy tone and transmits the ring back tone when a notice representing that a connection with the called party terminal was completed is received from the exchange.

3. The network control device according to claim 1, wherein the state determining unit determines whether the another network control device is in the congestion state based on call type information representing a type of a connection state between the another network control device and the calling party terminal, which is included in takeover data acquired from the another network control device.

4. A network control method for controlling a call connection between a calling party terminal and a called party terminal, the method comprising:
    determining whether an own network control device is in a congestion state and whether another network control device is in the congestion state, the own network control device being a handover target device and the another network control device being a handover source device;
    stopping transmitting a busy tone to the calling party terminal when the another network control device is in the congestion state and the own network control device is not in the congestion state;
    continuing to transmit the busy tone to the calling party terminal when the another network control device and the own network control device are in the congestion state; and
    newly starting to transmit a ring back tone when the transmission of the busy tone is stopped.

* * * * *